(12) United States Patent
Lee

(10) Patent No.: US 7,725,134 B2
(45) Date of Patent: May 25, 2010

(54) APPARATUS AND METHOD FOR PROCESSING ALERT MESSAGE OF MOBILE COMMUNICATION TERMINAL

(75) Inventor: Chul-Min Lee, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 789 days.

(21) Appl. No.: 11/274,294

(22) Filed: Nov. 16, 2005

(65) Prior Publication Data

US 2006/0121947 A1    Jun. 8, 2006

(30) Foreign Application Priority Data

Nov. 16, 2004  (KR) .................... 10-2004-0093660

(51) Int. Cl.
   *H04M 1/00* (2006.01)
   *H04B 1/38* (2006.01)
(52) U.S. Cl. .................... 455/566; 455/567; 455/154.2; 455/156.1; 455/158.4
(58) Field of Classification Search .................. 455/566, 455/567, 575.6, 90.3, 550.1, 566.1, 575.3, 455/575.4, 154.2, 156.1, 158.4
   See application file for complete search history.

(56) References Cited

U.S. PATENT DOCUMENTS

| | | | |
|---|---|---|---|
| 6,205,322 B1 * | 3/2001 | Muramatsu | 340/7.53 |
| 6,731,959 B1 | 5/2004 | Kumagai et al. | |
| 6,922,400 B2 * | 7/2005 | Iwakuni et al. | 370/270 |
| 7,123,945 B2 | 10/2006 | Kokubo | |
| 7,299,289 B1 * | 11/2007 | Lorenz et al. | 709/231 |
| 2001/0016508 A1 | 8/2001 | Kido et al. | |
| 2002/0016191 A1 * | 2/2002 | Ijas et al. | 455/575 |
| 2002/0065111 A1 | 5/2002 | Otsuka et al. | |
| 2002/0097275 A1 * | 7/2002 | Kobayashi et al. | 345/810 |
| 2002/0198021 A1 | 12/2002 | Boesen | |
| 2003/0078077 A1 | 4/2003 | Kokubo | |
| 2003/0119562 A1 | 6/2003 | Kokubo | |
| 2003/0144036 A1 | 7/2003 | Ito | |
| 2004/0214610 A1 * | 10/2004 | Tanemura et al. | 455/566 |
| 2006/0293088 A1 | 12/2006 | Kokubo | |

FOREIGN PATENT DOCUMENTS

| | | |
|---|---|---|
| CN | 2571080 Y | 9/2003 |
| CN | 1456008 | 11/2003 |
| EP | 1 271 904 A2 | 1/2003 |
| EP | 1 427 173 A1 | 6/2004 |
| JP | 2002-171317 A | 6/2002 |
| JP | 2003-125041 A | 4/2003 |
| JP | 2003-162355 A | 6/2003 |
| JP | 2003-204378 A | 7/2003 |
| KR | 10-2003-0056072 A | 7/2003 |

* cited by examiner

*Primary Examiner*—Tuan A Pham
(74) *Attorney, Agent, or Firm*—Birch, Stewart, Kolasch & Birch, LLP

(57) ABSTRACT

A mobile terminal and an apparatus and method for processing an alert message of a mobile communication terminal, are discussed. The apparatus includes at least one module for generating at least one alert message and outputting the generated alert message, and a controller for selectively displaying the outputted alert message on a second display unit according to a type of a task being executed on a first display unit.

18 Claims, 5 Drawing Sheets

APPARATUS AND METHOD FOR PROCESSING ALERT MESSAGE OF MOBILE COMMUNICATION TERMINAL

The present application claims under 35 U.S.C. §119, the priority benefit of Korean Patent Application No. 10-2004-0093660 filed Nov. 16, 2004 in Korea, the entire contents of which are herein fully incorporated by reference.

BACKGROUND OF THE INVENTION

1. Field of the Invention

The present invention relates to a mobile communication terminal and, more particularly, to an apparatus and method for processing an alert message of a mobile communication terminal.

2. Description of the Related Art

In general, a mobile communication terminal is a device for allowing a user to wirelessly page and be connected with another party for communication any time anywhere through switching control by an MSC (Mobile Switching Center) while moving in service areas covered by base stations (BSs). With the mobile communication terminal, data communication performed in symbols, numbers and characters and multimedia communication including image signals as well as voice communication can be available.

Most of the recently developed mobile communication terminals include an external or internal camera, with which a subject image can be received, and thus, video as well as a still image can be transmitted on a real time basis, providing wider utilization range such as video call.

A display unit of the related art mobile communication terminal will now be described with reference to FIG. 1.

FIG. 1 is a perspective view showing an opened state of a related art mobile communication terminal.

As shown in FIG. 1, the related art mobile communication terminal includes a first display unit 10 directed to a user when the mobile communication terminal is opened, and a second display unit (not shown) directed to the user when the mobile communication terminal is closed. The first display unit is located on an inner side of a flip body 12, whereas the second display unit is located outside the terminal on the outer side of the flip body 12. Thus, at any given point of time, the user can see only the first or second display unit.

The first display unit 10 displays and performs functions selected by a user, for example, call communication, message transmission/reception, still image and video shooting, a mobile game, video call, when the mobile communication terminal is opened. The second display unit displays state information of the mobile communication terminal provided to the user, for example, radiowave reception strength, setting of vibration or bell sound, alarm setting, battery capacity, current time and date, when the mobile communication terminal is closed.

The first display unit 10 cannot fully display and execute multiple tasks simultaneously. For example, when the user executes a video operation on the first display unit 10 and a call is received at the same time, a call notification/image appears partially by overlapping with the video being displayed and a portion of the video is hidden. As a result, the tasks being executed on the first display unit 10 interfere with each other.

As mentioned above, as for the related art mobile communication terminal, the first and second display units are installed on the opposite sides of the flip body and only one of the first and second display units is used according to the opening or closing of the mobile communication terminal, resulting in a problem that the display units cannot be effectively used simultaneously.

SUMMARY OF THE INVENTION

Therefore, an object of the present invention is to provide an apparatus and method for processing an alert message of a mobile communication terminal capable of effectively using multiple display units simultaneously by displaying alert messages on a second display unit according to a type of a task being executed on a first display unit.

Another object of the present invention is to provide a mobile terminal and an apparatus and method for displaying alert messages of the mobile terminal, which overcome the limitations and disadvantages associated with the related art.

To achieve at least the above objects in whole or in parts, there is provided in one aspect of the present invention, an apparatus for processing an alert message of a mobile communication terminal, the apparatus comprising at least one module for generating at least one alert message and outputting the generated at least one alert message; and a controller for selectively displaying the outputted at least one alert message on a second display unit according to a type of a task being executed on a first display unit.

To achieve at least these advantages in whole or in parts, there is further provided according to another aspect of the present invention, a method for processing an alert message of a mobile communication terminal, the method comprising generating at least one alert message and outputting the generated at least one alert message; determining a type of a task being executed in a first display unit; and selectively displaying the outputted at least one alert message on a second display unit according to the determining result.

According to another aspect of the present invention, there is provided a mobile terminal comprising a first body including a first display screen; and a second body including a second display screen and rotatably connected with the first body, wherein when the mobile terminal is opened, both the first and second display screens are simultaneously viewable.

According to another aspect of the present invention, there is provided a mobile terminal comprising a first body including a display unit, the display unit divided into at lest two display parts functioning as two independent display screens; and a second body rotatably coupled to the first body.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENTS

An apparatus and method for processing an alert message of a mobile communication terminal capable of effectively using multiple display units simultaneously by displaying an alert message on a second display unit according to a type of a task executed on a first display unit, in accordance with the embodiments of the present invention will now be described with reference to the accompanying drawings.

Figure 1:
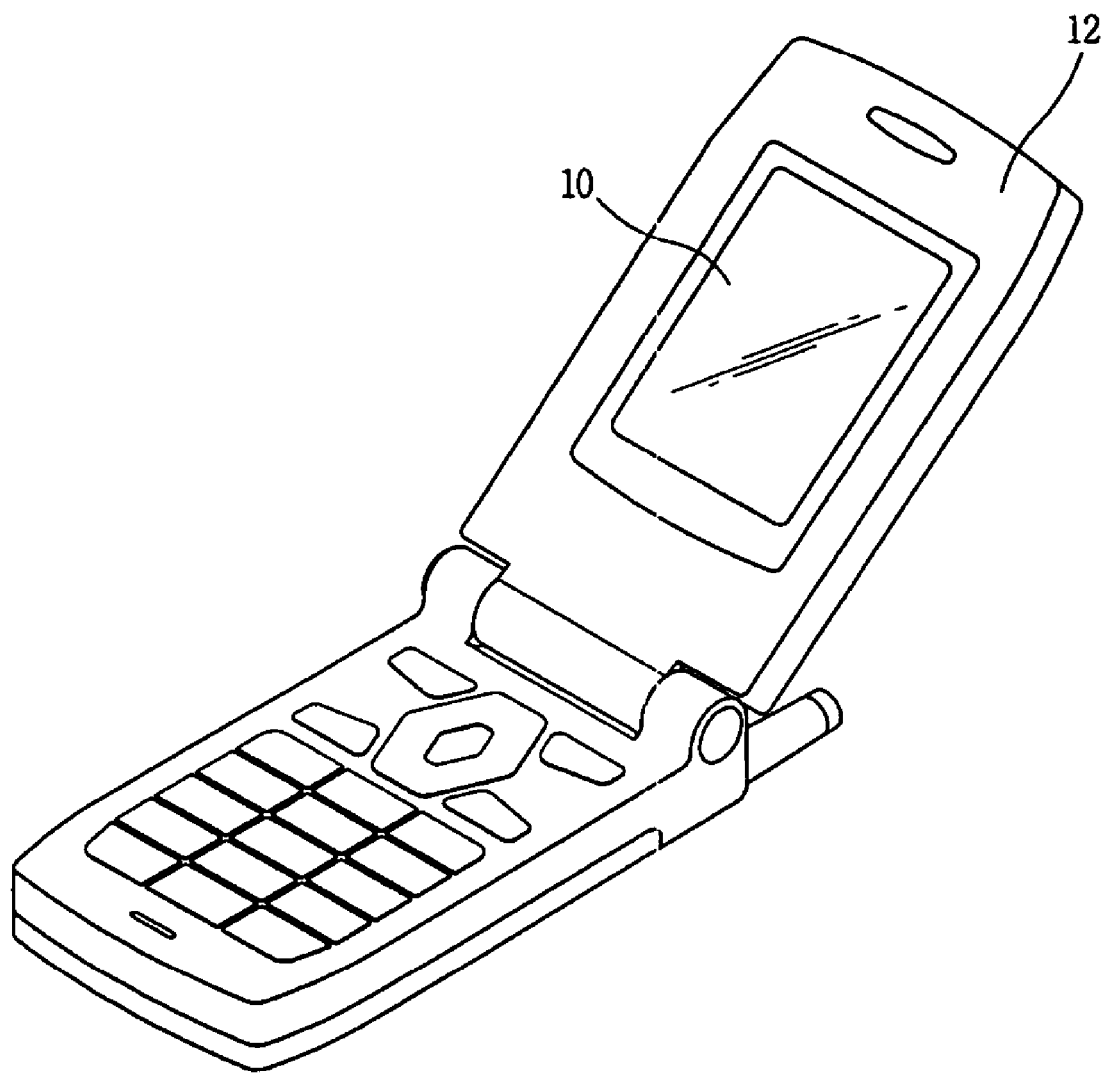
FIG. 1 is a perspective view showing an opened state of a related art mobile communication terminal.
Figure 2:
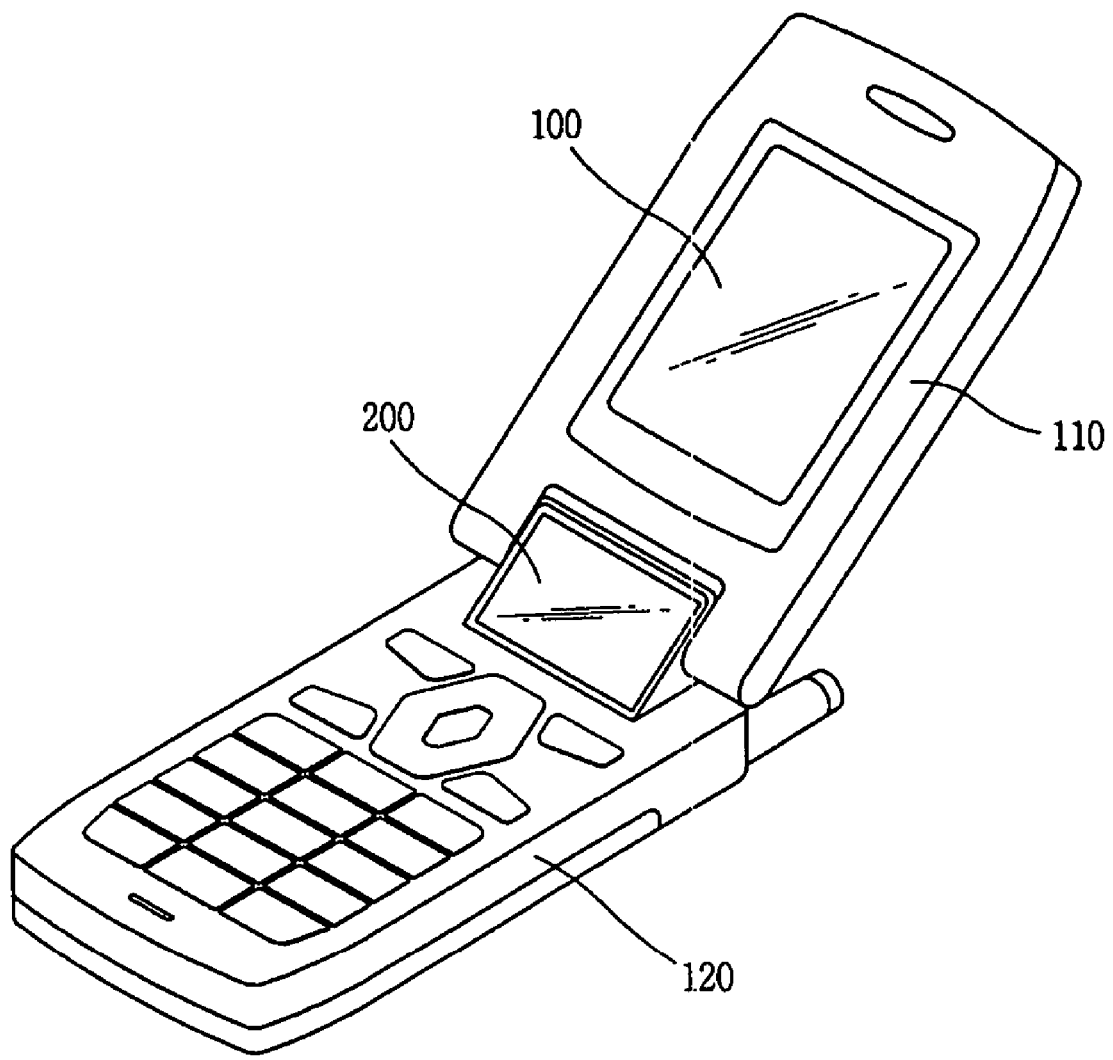
FIG. 2 is a perspective view showing an opened state of a mobile communication terminal in accordance with a first embodiment of the present invention.

FIG. 2 is a perspective view showing an opened state of a mobile communication terminal in accordance with a first embodiment of the present invention.

As shown in FIG. 2, the mobile communication terminal includes a first body 110 rotatably connected with a second body 120. The first body 110 includes a first display unit 100. The second body 120 includes a second display unit 200 located at an upper portion of the second body 120 and other known components such as key pads, etc. The second display unit 200 is positioned at a slant angle or in other fashion so that when the user opens the mobile terminal, the user can easily and fully see both the first and second display units 100 and 200 and so that when the user closes the mobile terminal, the user can easily see the second display unit 200. The mobile communication terminal can be a cellular phone, but is not limited thereto. The first and second display units 100 and 200 can be any known display devices such as liquid crystal displays, etc.

When the mobile communication terminal is opened, both the first and second display units 100 and 200 are installed to be directed to the user, so that the user can selectively display alert messages on the second display unit 200 according to the type of a task being executed on the first display unit 100. In this case, a controller 40 (FIG. 3) is used to process the alert messages.

When the mobile communication terminal is opened, the second display unit 200 can separately execute an operation, irrespective of an operation being executed on the first display unit 100, and display a list, which indicates operation(s) being executed on the first display unit 100, in an icon, a figure, character form, or some other manner depending on the type of the operations being executed on the first display unit 100.

In addition, the second display unit 200 can display and perform any information and tasks that are processed on the second display unit of the related art mobile communication terminal.

The apparatus for processing an alert message of a mobile communication terminal in accordance with the first embodiment of the present invention will be descried below with reference to FIG. 3.

Figure 3:
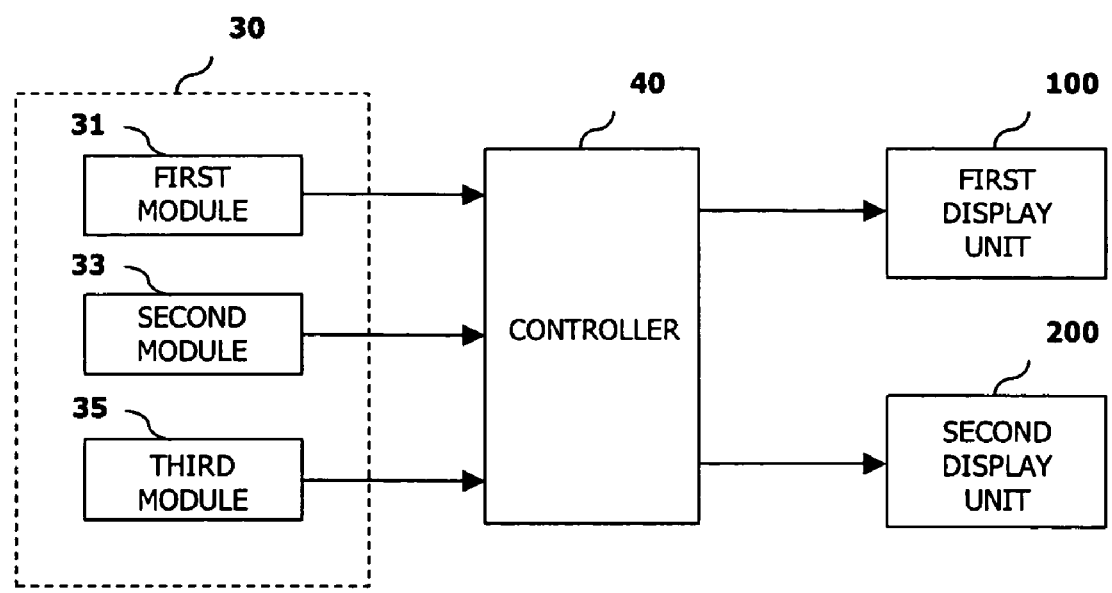
FIG. 3 illustrates the construction of an apparatus for processing an alert message of a mobile communication terminal in accordance with the first embodiment of the present invention.

FIG. 3 illustrates the construction of an apparatus for processing an alert message of a mobile communication terminal in accordance with the first embodiment of the present invention. This apparatus is provided in the mobile communication terminal, e.g., in the second body 120. The apparatus is discussed in connection with the mobile terminal of FIG. 2 (and FIG. 5), but is applicable to other similar devices according to the present invention.

As shown in FIG. 3, the apparatus for processing an alert message of a mobile communication terminal in accordance with the first embodiment of the present invention includes: a message generator 30 including at least one module for generating alert message(s) and outputting the generated alert message(s); and a controller 40 for selectively displaying the outputted alert message(s) on the second display unit 200 according to the type of each task being executed on the first display unit 100.

The alert message can be a notice message, a result message, a response message, a status message, or others.

Particularly, the message generator 30 includes a first module 31 for generating a notice message for informing about a call reception, a message reception, alarm, battery capacity, etc.; a second module 33 for generating a result message informing about a proceeding or a result of uploading or downloading of a file or message transmission, etc.; and a third module 35 for generating a response message to a set result of USSD (Unstructured Supplementary Services Data), IM (Instant Message)/PTT (Push To Talk), etc. Any number of modules can be provided in the message generator 30 and these modules can be implemented with computer software programs written in any known program language.

A method for processing the alert message of a mobile communication terminal in accordance with the present invention will now be described with reference to FIG. 4.

Figure 4:
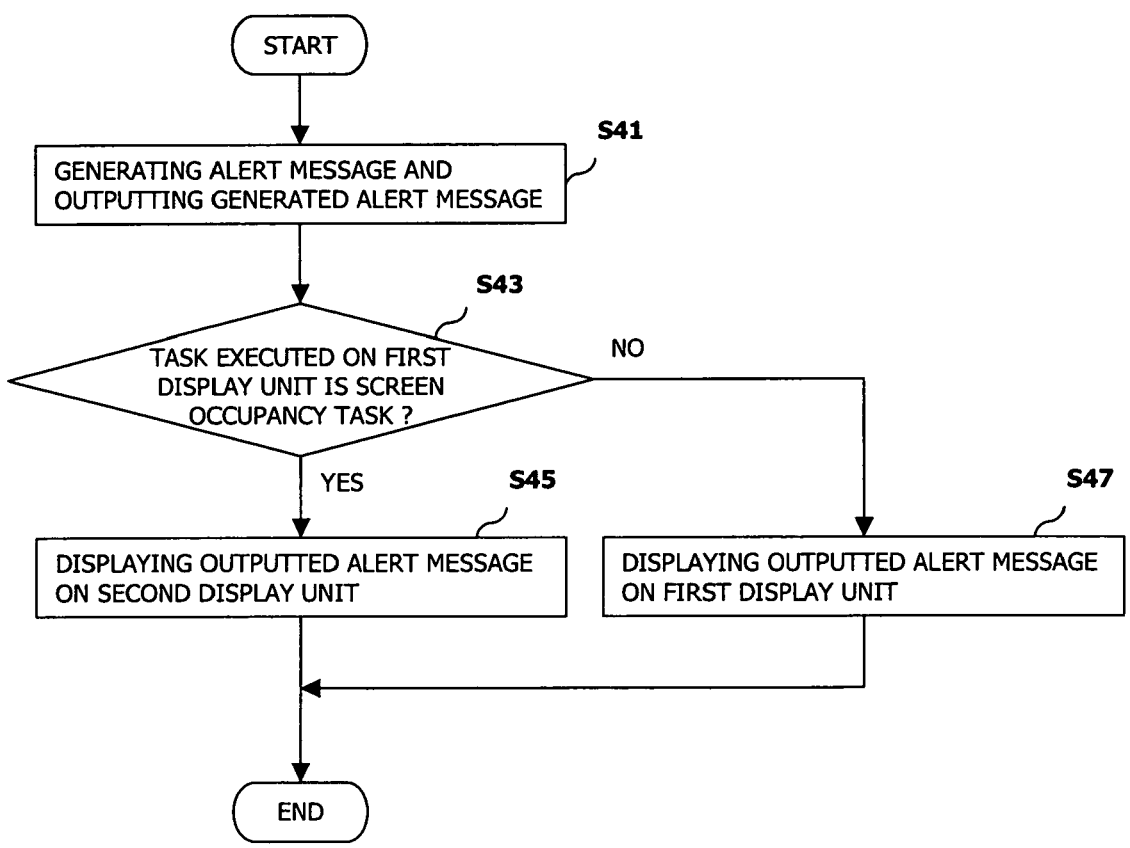
FIG. 4 is a flow chart of a method for processing an alert message of a mobile communication terminal in accordance with the first embodiment of the present invention.

FIG. 4 is a flow chart of a method for processing an alert message of a mobile communication terminal in accordance with the first embodiment of the present invention. This method can be implemented in the devices of FIGS. 2 and 3 or in other suitable device(s).

As shown in FIG. 4, the method in accordance with the first embodiment of the present invention includes: generating an alert message and outputting the generated alert message (step S41); determining whether a task executed on a first display unit is a screen occupancy task (step S43); and selectively displaying the outputted message on a first or second display unit according to the result of the determining step S43 (steps S45 and S47).

This method in FIG. 4 will be described in detail as follows.

First, when the mobile communication terminal executes multiple tasks, e.g., in response to a user's selections, the message generator 30 generates alert message(s) according to the state of an inactive task and outputs the generated alert message(s) (step S41).

Upon receiving the outputted alert message, the controller 40 determines whether the task being executed on the first display unit 100 is a screen occupancy task (step S43). The screen occupancy task refers to a task requiring continuous screen output by being connected to a network such as a video call or a VOD (Video On Demand), which is set by a manufacturer or the user.

Thereafter, the controller 40 selectively displays the inputted alert message on the first or second display unit 100 or 200. That is, if the task being executed on the first display unit 100 is a screen occupancy task, the controller 40 displays the received alert message on the second display unit 200 since the first display unit 100 is needed for the task on the first display unit 100 (step S45). If, however, the task being executed on the first display unit 100 is not a screen occupancy task, the controller 40 temporarily interrupts the execution of the task being executed on the first display unit 100, and displays the received alert message on the first display unit 100. After a certain time has passed or in response to a certain action (e.g., a response for the user), the displaying of the alert message may end and the controller 40 resumes the task on using the first display unit 100.

Various examples of displaying alert messages in various situations on the second display unit 200 of the mobile communication terminal of FIGS. 2 and 3 in accordance with the first embodiment of the present invention will be described in detail as follows.

In a first example, the controller 40 receives a notice message such as a call reception, a message reception, alarm, battery capacity or the like and displays the received notice message on the second display unit 200.

For instance, the user can receive a new message while the mobile communication terminal is executing an Internet service operation for the user's Internet surfing through the first display unit 100, which can be considered a screen occupancy task. At this time, the controller 40 displays on the second display unit 200 a notice message informing that the new message has been received. Accordingly, the user can check the new message through the second display unit 200 without interrupting the Internet service operation in progress. Herein, the new message can include a short message, a long message, a multimedia message, an e-mail, and so on.

In a second example, the controller 40 receives a result message informing about the proceeding of file uploading/downloading and message transmission and displays the received result message on the second display unit 200.

For instance, while the user is downloading a file through the Internet using the first display unit 100, he/she can also perform multi-tasking to continuously proceed with a different task. For example, after starting the downloading of the file using the first display unit 100, the user can execute a message function for transmitting a message. Then, when the file downloading is completed, the controller 40 displays an alert message informing about the result as well as the status of the file downloading on the second display unit 200.

The multi-tasking does not depend on or supplement an operation but involves executing multiple independent operations with the same level simultaneously. For example, an executed task refers to one of (1) an online service such as an online game, a mobile Internet service, a VOD function or a file downloading function, (2) various message functions such as chatting, instant messaging, text messaging, multimedia messaging and an e-mail function, (3) a call function such as a voice call or a video call, (4) a camera function such as video shooting or still image shooting, and (5) various supplementary functions such as a scheduler, phone book searching, a calculator, a memo note, communication content sound recording, communication content video recording, setting of a terminal state, calendar searching, overseas time checking, watch alarm setting, or reproducing of a video or music file.

In a third example, the controller 40 receives a response message informing about the completion of setting of the USSD, the IM/PTT or the like, and displays the received response message on the second display unit 200.

For instance, while the user is executing the Internet service operation such as the Internet surfing on the first display unit 100, he/she can receive the response message with respect to the USSD and IM/PTT program. At this time, the controller 40 displays the received response message on the second display unit 200. In this case, when the user sets a certain value for the telephone network system through a network, there can be an origination number presentation or a prohibition of the origination number presentation, a service request/release operation in case of the USSD, and registration of a new user for the telephone network system in case of the IM/PTT. The response message in the USSD and the IMN/PTT means, e.g., a message informing about such a processing result.

A mobile communication terminal in accordance with a second embodiment of the present invention will now be described with reference to FIG. 5.

Figure 5:
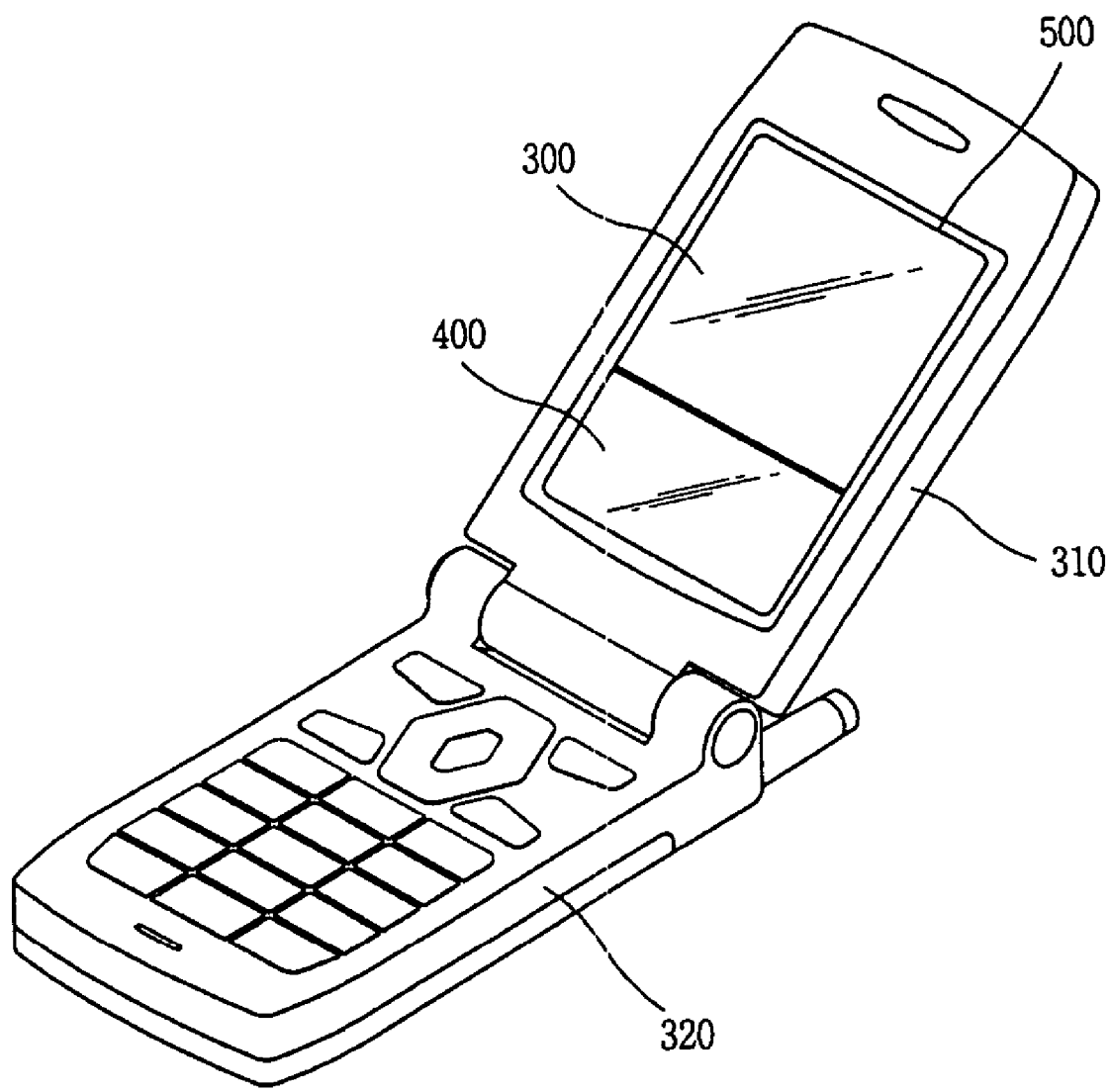
FIG. 5 is a perspective view showing an opened state of a mobile communication terminal in accordance with a second embodiment of the present invention.

FIG. 5 is a perspective view showing an opened state of a mobile communication terminal in accordance with the second embodiment of the present invention.

As shown in FIG. 5, compared to the first embodiment of the present invention in which the display units are separately installed, the mobile communication terminal in accordance with the second embodiment of the present invention is constructed such that one display unit is divided into multiple regions each with a predetermined size to form multiple display parts or screen parts.

More specifically, the mobile communication terminal includes the first and second bodies 310 and 320. The first body 310 includes a display unit 500 divided into two parts—first and second display parts 300 and 400. The first and second display parts 300 and 400, respectively, function in the same manner as the first and second display units 100 and 200 of the first embodiment, except that they are part of the same display unit. The second body 320 includes known components such as key pads.

The apparatus for processing an alert message discussed in connection with FIG. 3 is also included in the mobile communication terminal of FIG. 5 and performs the same functions therein.

Further, the method of FIG. 4 is equally applicable to the mobile communication terminal of FIG. 5. In this regard, the first and second display parts 300 and 400 would correspond respectively to the first and second display units mentioned in the method of FIG. 4.

That is, the principles of the operation of the apparatus for processing an alert message of the mobile communication terminal in accordance with the second embodiment of the present invention are the same as those of the first embodiment, and a detailed description of which is thus omitted.

If needed, the invention also includes some means for the user to switch a key/selection operation between the first and second display units or parts so that appropriate selections using the first or second display part/unit may be made. For instance, a key/button for switching between the first and second display units 100 and 200 (or 300 and 400) can be provided on the mobile terminal, so that the existing keys can be used to make selections on both the first and second display units. As one example, while the user is surfing the Internet using the first display unit/part, a switch button can be selected in which case the user can now make selections on the second display unit/part using the key pads on the mobile terminal. In another example, different keys/buttons may be provided so that the user can maneuver the menus/images displayed on each of the first and second display units/parts at the same time if desired. In still another example, the second display unit/part may only be used to display and not to receive any user input thereto. In that case, the first display unit/part would receive all user inputs. Other variations are possible.

As so far described, the apparatus and method for processing an alert message of a mobile communication terminal in accordance with the present invention has such an advantage that alert messages are displayed on the second display unit according to a type of a task executed on the first display unit, so multiple display units can be effectively used simultaneously.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A mobile communication terminal, comprising:
   a first display unit configured to display information related to a first task executing on the mobile terminal;
   a second display unit configured to display information related to a second task that is independent of and unrelated to the first task executing on the mobile terminal;
   an input unit configured to receive an input from a user indicating whether the first task is a screen occupation task requiring continuous screen output on the first display unit; and
   a controller configured to determine whether or not the first task is the screen occupation task requiring continuous screen output when an alert message is generated, and to selectively display the alert message on the second display unit when the first task is the screen occupation task and to display the alert message on the first display unit when the first task is not the screen occupation task.

2. The mobile terminal of claim 1, wherein the alert message is information about at least one of a call being received on the mobile terminal, a message being received on the terminal, an alarm being activated on the mobile terminal, and a current battery capacity of the mobile terminal.

3. The mobile terminal of claim 1, wherein the alert message includes information about an IM (Instant Message)/PTT (Push To Talk) call being received on the mobile terminal.

4. The mobile terminal of claim 1, wherein the first and second display units comprise Liquid Crystal Displays (LCDs).

5. The mobile terminal of claim 1, wherein the continuous screen occupancy task comprises displaying a video.

6. The mobile terminal of claim 1, wherein the continuous screen occupancy task comprises one of an online service, a message function, a call function, a camera function.

7. The mobile terminal of claim 1, wherein the first display unit is disposed in a front body of the mobile terminal and the second display unit is rotatably disposed at a hinging portion between the front body and a rear body of the mobile terminal such that the second display unit is positioned at a slant angle that is parallel with the first display unit when the front body is opened from the rear body.

8. The mobile, terminal of claim 1, wherein the first display unit is separated from the second display unit.

9. A method of controlling a mobile communication terminal, the method comprising:
   displaying on a first display unit of the mobile terminal information related to a first task executing on the mobile terminal;
   displaying on a second display unit information related to a second task that is independent of and unrelated to the first task executing on the mobile terminal;
   receiving an input from a user indicating whether the first task is a screen occupation task requiring continuous screen output on the first display unit; and
   determining via a control unit of the mobile terminal whether or not the first task is the screen occupation task requiring continuous screen output when an alert message is generated; and
   selectively displaying the alert message on the second display unit when the first task is the screen occupation task and displaying the alert message on the first display unit when the first task is not the screen occupation task.

10. The method of claim 9, wherein the continuous screen occupancy task comprises displaying a video.

11. The method of claim 9, wherein the continuous screen occupancy task comprises one of an online service, a message function, a call function, a camera function.

12. The method of claim 9, wherein the alert message is information about at least one of a call being received on the mobile terminal, a message being received on the terminal, an alarm being activated on the mobile terminal, and a current battery capacity of the mobile terminal.

13. The method of claim 9, wherein the alert message includes information about an IM (Instant Message)/PTT (Push To Talk) call being received on the mobile terminal.

14. The method of claim 9, wherein the first and second display units comprise Liquid Crystal Displays (LCDs).

15. The method of claim 9, wherein the continuous screen occupancy task comprises displaying a video.

16. The method of claim 9, wherein the continuous screen occupancy task comprises one of an online service, a message function, a call function, a camera function.

17. The method of claim 9, wherein the first display unit is disposed in a front body of the mobile terminal and the second display unit is rotatably disposed at a hinging portion between the front body and a rear body of the mobile terminal such that the second display unit is positioned at a slant angle that is parallel with the first display unit when the front body is opened from the rear body.

18. The method of claim 9, wherein the first display unit is separated from the second display unit.

* * * * *